(12) United States Patent
Martins et al.

(10) Patent No.: US 11,675,631 B2
(45) Date of Patent: Jun. 13, 2023

(54) BALANCING MAINFRAME AND DISTRIBUTED WORKLOADS BASED ON PERFORMANCE AND COSTS

(71) Applicant: KYNDRYL, INC., New York, NY (US)

(72) Inventors: Allan Douglas Moreira Martins, Sumare (BR); Tiago Battiva Ferreira, Osasco (BR); Jose Gilberto Biondo Junior, Valinhos (BR); Tiago Dias Generoso, Pocos de Caldas (BR); Robert Justiniano Ferreira, Hortolândia (BR)

(73) Assignee: Kyndryl, Inc., New York, NY (US)

( * ) Notice: Subject to any disclaimer, the term of this patent is extended or adjusted under 35 U.S.C. 154(b) by 362 days.

(21) Appl. No.: 17/035,873

(22) Filed: Sep. 29, 2020

(65) Prior Publication Data

US 2022/0100578 A1    Mar. 31, 2022

(51) Int. Cl.
*G06F 9/50* (2006.01)
*G06Q 10/0631* (2023.01)

(52) U.S. Cl.
CPC ............ *G06F 9/5083* (2013.01); *G06F 9/505* (2013.01); *G06Q 10/06315* (2013.01)

(58) Field of Classification Search
None
See application file for complete search history.

(56) References Cited

U.S. PATENT DOCUMENTS

| | | | | |
|---|---|---|---|---|
| 8,032,846 B1* | 10/2011 | Balasubramanian | ... | G06F 30/30 716/139 |
| 8,406,756 B1* | 3/2013 | Reeves | .................... | H04W 4/00 455/434 |
| 8,412,822 B1* | 4/2013 | Weinman, Jr. | ........ | G06F 9/4843 709/201 |

(Continued)

FOREIGN PATENT DOCUMENTS

EP    2251784 B1    10/2017

OTHER PUBLICATIONS

Weintraub, Phil, "Compute Trends and the Evolution of the IBM Mainframe", IBM Systems Media, Jul. 18, 2019, 3 pages, <https://ibmsystemsmag.com/IBM-Z/07/2019/compute-trends-ibm-mainframe>.

(Continued)

*Primary Examiner* — Adam Lee
(74) *Attorney, Agent, or Firm* — Dan Housley; Andrew M. Calderon; Calderon Safran & Cole, P.C.

(57) ABSTRACT

In an approach for balancing mainframe and distributed workloads, a processor receives a request to allocate an application workload to a mainframe platform and a distributed computing platform. The application workload includes a plurality of work units. A processor collects performance and cost data associated with the application workload, the mainframe platform, and the distributed computing platform. A processor determines the mainframe platform and the distributed computing platform for the plurality of work units of the application workload, based on the analysis of the performance and cost data. A processor allocates the (Continued)

plurality of work units of the application workload to run on the mainframe platform and the distributed computing platform respectively to balance performance and cost in real time.

17 Claims, 11 Drawing Sheets

(56) References Cited

U.S. PATENT DOCUMENTS

| | | | |
|---|---|---|---|
| 8,583,799 | B2 | 11/2013 | Podila |
| 8,843,929 | B1* | 9/2014 | Oppenheimer ....... G06F 9/5044 718/102 |
| 8,868,711 | B2 | 10/2014 | Skjolsvoid |
| 8,959,220 | B2 | 2/2015 | Frey et al. |
| 9,081,613 | B2 | 7/2015 | Bieswanger et al. |
| 9,384,061 | B1 | 7/2016 | Deivanayagam et al. |
| 9,495,222 | B1* | 11/2016 | Jackson ............. G06F 11/3452 |
| 9,680,657 | B2 | 6/2017 | Spicer et al. |
| 10,841,236 | B1* | 11/2020 | Jin ........................ G06N 20/00 |
| 10,891,201 | B1* | 1/2021 | Kozlovsky .......... G06F 11/1469 |
| 11,016,889 | B1* | 5/2021 | Benjamin ............... G06F 12/10 |
| 11,379,266 | B2* | 7/2022 | Toal ..................... G06F 9/5072 |
| 2008/0071894 | A1* | 3/2008 | Luss ................. H04N 7/17336 725/86 |
| 2010/0166065 | A1* | 7/2010 | Perlman ................. H04N 19/61 375/E7.173 |
| 2012/0011518 | A1* | 1/2012 | Duan ..................... G06F 9/5061 718/104 |
| 2013/0263117 | A1* | 10/2013 | Konik ................. G06F 9/45558 718/1 |
| 2015/0215173 | A1* | 7/2015 | Dutta .................... G06F 9/5038 709/226 |
| 2015/0263985 | A1 | 9/2015 | Schmitter et al. |
| 2016/0087909 | A1 | 3/2016 | Chatterjee et al. |
| 2016/0300024 | A1* | 10/2016 | Janssen .................. G06Q 10/06 |
| 2017/0075709 | A1 | 3/2017 | Feng et al. |
| 2017/0090988 | A1* | 3/2017 | Young .................. G06F 9/5094 |
| 2017/0126795 | A1 | 5/2017 | Kumar et al. |
| 2017/0308411 | A1* | 10/2017 | Brill ..................... G06F 9/5094 |
| 2018/0064936 | A1 | 3/2018 | Shazley et al. |
| 2019/0155652 | A1* | 5/2019 | Chou .................... G06F 9/5027 |
| 2019/0213052 | A1* | 7/2019 | Arikuma ................. G06F 9/50 |
| 2020/0026575 | A1* | 1/2020 | Guim Bernat .......... H04L 12/66 |
| 2020/0089533 | A1 | 3/2020 | Guha |

OTHER PUBLICATIONS

Anonymous et al., "Mainframe Cost Optimization", BMC Software Inc., Accessed on Aug. 11, 2020, 11 pages, <https://www.bmc.com/it-solutions/mlc-software-management.html>.

Anonymous et al., "Mainframes: Are They a Legacy Technology?", SACA, California, United States, Aug. 15, 2019, 3 pages, <https://www.sacatech.com/2019/08/15/mainframes-are-they-a-legacy-technology/>.

Bingell, Nicholas Dayl, "Cost Factors that Influence Ownership of Mainframe or Cloud-Based Data Center Environments", University of Oregon, Applied Information Management, Dec. 2014, 45 pages, <https://pdfs.semanticscholar.org/f557/d19ab2039406812c9a6051c4562b8f463f0c.pdf>.

Crutcher et al., "Considerations of Moving Applications Off the Mainframe", Splice Machine, Jan. 22, 2020, 17 pages, <https://splicemachine.com/considerations-of-moving-applications-off-the-mainframe/>.

Mell et al., "The NIST Definition of Cloud Computing", Recommendations of the National Institute of Standards and Technology, Special Publication 800-145, Sep. 2011, 7 pages.

O'Malley, Christopher, "Guess What? Mainframe Use Is Growing, But Challenges Remain Unsolved", Forbes Technology Council, Forbes Media LLC, Jul. 6, 2018, 6 pages, <https://www.forbes.com/sites/forbestechcouncil/2018/07/06/guess-what-mainframe-use-is-growing-but-challenges-remain-unsolved/#5653009a5ee9>.

Rogers, Roger, "The financial impact of indirect costs in mainframe and distributed IT environments", IBM Corporation, IBM IT Economics Consulting & Research, Nov. 2018, 5 Pages<https://www.ibm.com/downloads/cas/OMG4E8WQ>.

Woodie, Alex, "Moving Off Big Iron? Be Very Careful, Gartner Says", IT Jungle, Dec. 9, 2019, 5 Pages, <https://www.itjungle.com/2019/12/09/moving-off-big-iron-be-very-careful-gartner-says/>.

British Office Action in GB Application No. GB2113295.6 dated Apr. 20, 2022, 12 pages.

* cited by examiner

BALANCING MAINFRAME AND DISTRIBUTED WORKLOADS BASED ON PERFORMANCE AND COSTS

BACKGROUND

The present disclosure relates generally to the field of mainframe and distributed computing, and more particularly to allocating an application workload to run on a mainframe platform and a distributed computing platform.

A mainframe may be a large computer system designed to process very large amounts of data quickly. Mainframe systems may be widely used in industries like the financial sector, airline reservations, logistics and other fields where a large number of transactions need to be processed as part of routine business practices. A distributed computer system may consist of multiple software components that are on multiple computers but run as a single system. The computers that are in a distributed system can be physically close together and connected by a local network, or they can be geographically distant and connected by a wide area network. A distributed system can consist of any number of possible configurations, such as mainframes, personal computers, workstations, minicomputers, and so on. The goal of distributed computing is to make such a network work as a single computer.

SUMMARY

Aspects of an embodiment of the present disclosure disclose an approach for balancing mainframe and distributed workloads. A processor receives a request to allocate an application workload to a mainframe platform and a distributed computing platform. The application workload includes a plurality of work units. A processor collects performance and cost data associated with the application workload, the mainframe platform, and the distributed computing platform. A processor determines the mainframe platform and the distributed computing platform for the plurality of work units of the application workload, based on the analysis of the performance and cost data. A processor allocates the plurality of work units of the application workload to run on the mainframe platform and the distributed computing platform respectively to balance performance and cost in real time.

DETAILED DESCRIPTION

The present disclosure is directed to systems and methods for balancing mainframe and distributed workloads based on performance and costs.

Embodiments of the present disclosure recognize a need for determining to build applications using mainframe or distributed (e.g., any non-mainframe) computing platforms. Embodiments of the present disclosure recognize a need to decide if an entire application will go to a mainframe or distributed platform, and/or if a part of the application can run on a mainframe platform and another part on a distributed platform. Embodiments of the present disclosure recognize a need for understanding pros and cons to work with both mainframe and distributed solutions and focusing on the usage of one or another. Embodiments of the present disclosure further recognize a need for allocating microservices solutions on mainframes or distributed environments. Both platforms can offer different benefits based on reliability, cost, performance, and security.

Embodiments of the present disclosure disclose a solution that can support the decision in real time if a part of an application can run on a mainframe or can go temporarily to a distributed environment based on the cost models used, performance metrics, and availability. Embodiments of the present disclosure disclose collecting and processing data from a variety of data sources to enable the decision making on running available applications on mainframe or distributed systems based on relevant information processed. Some samples of relevant information may include processing cost, latency, throughput and availability. Embodiments of the present disclosure disclose reducing application processing costs while still achieving performance, throughput and user required performance metrics. Embodiments of the present disclosure disclose evaluating an application workload from a mainframe environment, breaking the workload in logical pieces, and ranking the activities based on the resources consumption. Embodiments of the present disclosure disclose identifying opportunities to save costs by sending a part of the workload to be processed by a distributed environment. Embodiments of the present disclosure disclose analyzing historical performance data to help make a future decision.

Figure 1:
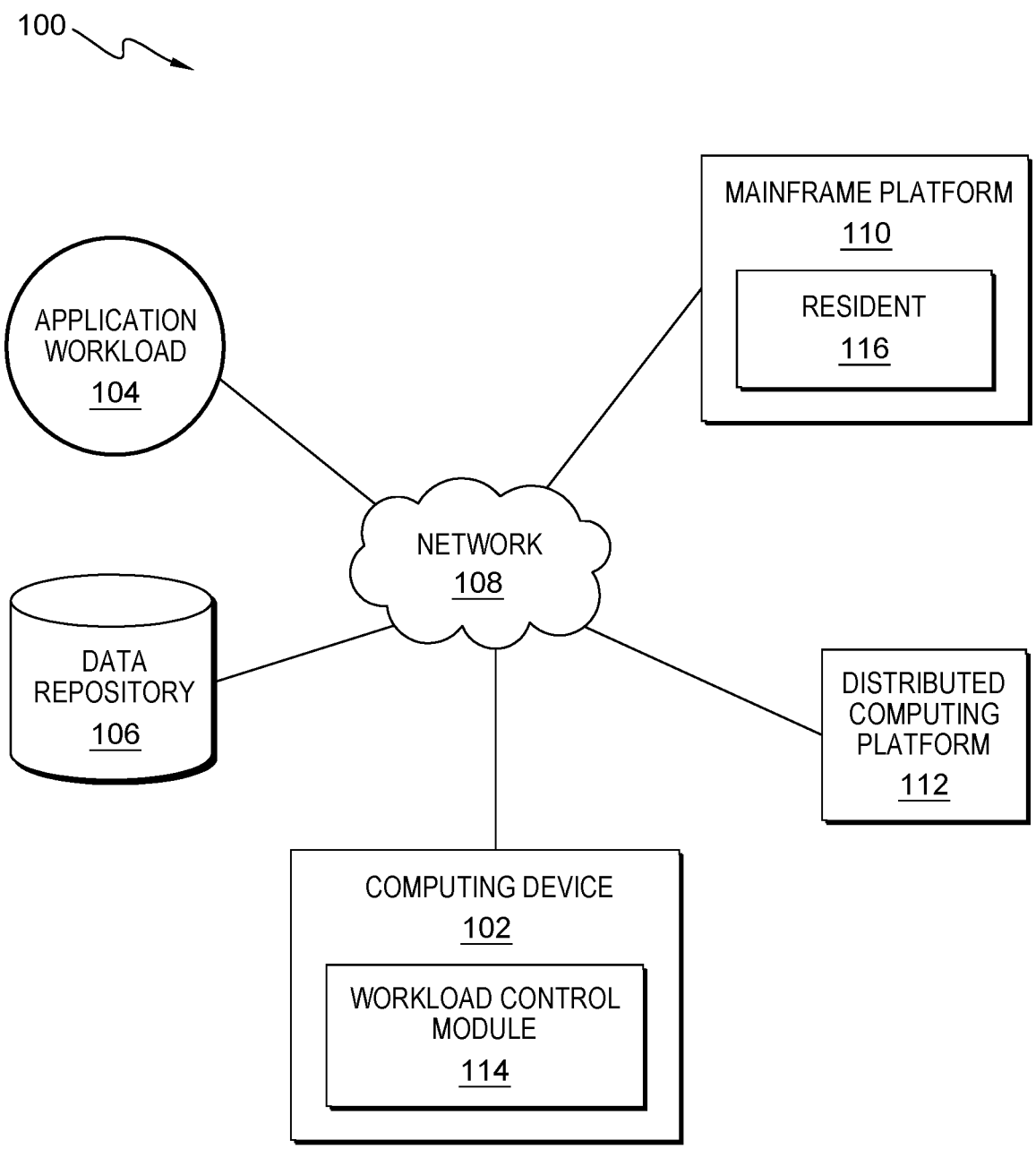
FIG. 1 is a functional block diagram illustrating a workload control environment, in accordance with an embodiment of the present disclosure.

The present disclosure will now be described in detail with reference to the Figures. FIG. 1 is a functional block diagram illustrating a workload control environment, generally designated 100, in accordance with an embodiment of the present disclosure.

In the depicted embodiment, workload control environment 100 includes computing device 102, application workload 104, mainframe platform 110, distributed computing platform 112, data repository 106, and network 108.

In one or more embodiments, application workload 104 may be an application or a service deployed in various computing platforms or environments, e.g., mainframe platform 110 and or distributed computing platform 112. The service could be a massive one comprising of hundreds of microservices working in conjunction with each other or a modest individual service. Application workload 104 may be all the individual capabilities and units of work that make up a discrete application. Application workload 104 may run in various computing platforms or environments, e.g., mainframe platform 110 and or distributed computing platform 112. Application workload 104 may be evaluated with performance (e.g., how easily mainframe platform 110 and or distributed computing platform 112 may handle application workload 104), which in turn is generally divided into response time (the time between a user request and a response to the request from the platforms) and throughput (how much work is accomplished over a period of time). Application workload 104 may be an independent service or collection of code that can be executed. Application workload 104 may be executed across computer assets, e.g., mainframe platform 110 and or distributed computing platform 112. Application workload 104 may include the amount of work that needs to be accomplished by computer resources in a certain period of time.

In one or more embodiments, mainframe platform 110 may be a mainframe environment that includes one or more mainframe computers (or exchangeable called mainframes) and aspects of the mainframes' operation, integration and interfaces. A mainframe may be a type of computer that generally is known for a large size, amount of storage, processing power and high level of reliability. A mainframe may be used by large organizations for mission-critical applications requiring high volumes of data processing. A mainframe may have the ability to run (or host) multiple operating systems. A mainframe can add or hot swap system capacity without disruption. A mainframe may be designed to handle very high-volume input and output (I/O) and emphasize throughput computing. A mainframe may be a large type of server. A mainframe may support thousands of applications and input/output devices to simultaneously serve thousands of users. A mainframe may be a central data repository, or hub, in a corporation's data processing center, linked to users through less powerful devices such as workstations or terminals. A mainframe may host commercial databases, transaction servers, and applications that require a greater degree of security and availability than is commonly found on smaller-scale machines. A mainframe may be a computer used by large organizations for critical applications, bulk data processing, such as census, industry and consumer statistics, enterprise resource planning, and transaction processing.

Mainframe platform 110 may offer different benefits based on reliability, cost, performance, and security. In the depicted embodiment, mainframe platform 110 includes resident 116. Resident 116 may collect and provide resource and system data of mainframe platform 110 to be accessed upon a request, for example, by workload control module 114 on computing device 102. The resource and system data may include performance and capacity data. Resident 116 may monitor and track mainframe resources to report back to workload control module 114 on performance and usage statistics, as well as workloads running in mainframe platform 110. Optionally, resident 116 can also communicate with other residents in other logical partitions to consolidate data being sent over to workload control module 114.

In one or more embodiments, distributed computing platform 112 may be a distributed computing environment whose components may be located on different networked computers. For the purpose of illustration, distributed computing platform 112 may be any platform other than a mainframe platform. Distributed computing platform 112 may include a plurality of distributed computers, which may communicate and coordinate actions by passing messages to one another. Distributed computing platform 112 may include multiple components (e.g., directory services, file services, security services) integrated to work closely toward a developed objective. The objectives may include building of custom applications or providing of support to other applications. The components in distributed computing platform 112 may interact with one another in order to achieve a common objective. Distributed computing platform 112 may include an architecture, a set of standard service, and application programs, built on top of an existing operating system which hides the differences among individual distributed computers. Distributed computing platform 112 may support development and usage of distributed applications in a single distributed system.

Distributed computing platform 112 may provide various benefits including, for example, open source solutions, faster deployment time, and larger knowledge base. Mainframe platform 110 and distributed computing platform 112 may have different infrastructure support requirements. Mainframe platform 110 may use a centralized method of computing. Many of the infrastructure elements for mainframe platform 110 may be included already and may be internally shared. Distributed computing platform 112 may rely on a shared infrastructure. Elements of a distributed application on distributed computing platform 112 may be deployed on separate servers and may be connected through networks.

In one or more embodiments, data repository 106 may include and save data from mainframe platform 110, distributed computing platform 112, and application workload 104. Data repository 106 may include performance and cost data. For example, the performance and cost data may include usage, cost, latency, and throughput data. The performance and cost data may be process priority, processing index, data requirement, connectivity, system affinity, server health, management, and business data. For example, performance and cost data may be information including usage, the number of servers, response-time, cost, connectivity, and throughput of mainframe platform 110 and distributed computing platform 112. The performance and cost data may be collected from data system management and resource management data of mainframe platform 110. Workload control module 114 may collect and process data from a variety of data sources to enable the decision making on running available applications on mainframe or distributed systems, e.g., mainframe platform 110 and distributed computing platform 112, based on relevant information processed. Some samples of relevant information may include processing cost, latency, throughput and availability. The performance and cost data may include process priority, processing index (e.g., how much CPU application workload 104 is expected to consume), data requirements (e.g., database access, file access), connectivity, and system affinity. The performance and cost data may include server health data, for example, connectivity, availability, processing speed and capacity, memory, I/O rate, cost, and networking. Workload control module 114 may collect and analyze management and business data, for example, key performance indexes, cost models, and application and system thresholds to determine where workload control module 114 run in a variety of heterogeneous environments that dispose the required components to process application workload 104. Workload control module 114 may update historical data associated with application workload 104 in data repository 106. Workload control module 114 may process and update data repository 106 to update decision-making information data.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to workload control module 114 and network 108 and is capable of processing program instructions and executing workload control module 114, in accordance with an embodiment of the present disclosure. Computing device 102 may include internal and external hardware components, as depicted and described in further detail with respect to FIG. 9. In the depicted embodiment, computing device 102 is located externally and accessed through a communication network such as network 108. However, in other embodiments, computing device 102 may be located on mainframe platform 110, distributed computing platform 112, or any other suitable place accessed through a communication network such as network 108.

Further, in the depicted embodiment, computing device 102 includes workload control module 114. In the depicted embodiment, workload control module 114 is located on computing device 102. However, in other embodiments, workload control module 114 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and workload control module 114, in accordance with a desired embodiment of the disclosure.

In one or more embodiments, workload control module 114 is configured to receive a request to allocate application workload 104 to mainframe platform 110 and distributed computing platform 112. In an example, workload control module 114 may receive a request to allocate application workload 104 from a user. In another example, workload control module 114 may automatically receive application workload 104 to be allocated to mainframe platform 110 and distributed computing platform 112. Application workload 104 may include a plurality of work units to be allocated to run on mainframe platform 110 and distributed computing platform 112 respectively. Each work unit can be a logic piece of application workload 104 that can run on mainframe platform 110 and distributed computing platform 112. Workload control module 114 may check data repository 106 for information related to application workload 104 to be processed. For example, workload control module 114 may search data and information associated with application workload 104, including, for example, the system or network where application workload 104 is from, operating system, required components (e.g., network, I/O, memory, CPU), system affinity, and priority information (e.g., acquired either from application workload 104 itself or data repository 106). Workload control module 114 may determine whether any historical data related to application workload 104 exists in data repository 106. If workload control module 114 determines some historical data related to application workload 104 exists in data repository 106, workload control module 114 may further verify the historical data related to the application workload. If workload control module 114 determines no historical data related to application workload 104 exists in data repository 106, workload control module 114 may compare priority of application workload 104 with processing capacity of eligible platforms, for example, mainframe platform 110 and distributed computing platform 112. Workload control module 114 may perform a cost estimation of running application workload 104 in each eligible platform, for example, mainframe platform 110 and distributed computing platform 112.

In one or more embodiments, workload control module 114 is configured to collect performance and cost data associated with mainframe platform 110, distributed computing platform 112, and application workload 104. Workload control module 114 may analyze and process the collected performance and cost data. The performance and cost data can be from data repository 106. The collected data can be further saved and updated in data repository 106. The performance and cost data may include usage, cost, latency, and throughput data. The performance and cost data may process priority, processing index, data requirement, connectivity, system affinity, server health, management, and business data. For example, performance and cost data may be information including usage, the number of servers, response-time, cost, connectivity, and throughput of mainframe platform 110 and distributed computing platform 112. The performance and cost data may be collected from data system management and resource management data of mainframe platform 110. Workload control module 114 may collect and process data from a variety of data sources to enable the decision making on running available applications on mainframe or distributed systems, e.g., mainframe platform 110 and distributed computing platform 112, based on relevant information processed. Some samples of relevant information may include processing cost, latency, throughput, availability, and others. Workload control module 114 may collect user input data and preferences to compare against the performance and cost data from mainframe platform 110 and distributed computing platform 112. Workload control module 114 may collect and analyze data from a variety of sources to gather the performance and cost data associated with application workload 104. The performance and cost data may include process priority, processing index (e.g., how much CPU application workload 104 is expected to consume), data requirements (e.g., data base access, file access), connectivity, system affinity. The performance and cost data may include server health data, for example, connectivity, availability, processing speed and capacity, memory, I/O rate, cost, and networking. Workload control module 114 may collect and analyze management and business data, for example, key performance indexes, cost models, and application and system thresholds to determine where workload control module 114 run in a variety of heterogeneous environments that dispose the required components to process application workload 104.

In one or more embodiments, workload control module 114 is configured to determine mainframe platform 110 and distributed computing platform 112 for the plurality of work units of the application workload, based on the analysis of the performance and cost data and requirements associated with application workload 104. Workload control module 114 may prioritize each eligible platform, for example, mainframe platform 110 and distributed computing platform 112 for the plurality of work units of application workload 104. Workload control module 114 may evaluate application workload 104. Workload control module 114 may break application workload 104 in logical pieces, e.g., work units. Workload control module 114 may rank activities of work units in application workload 104 based on the resources consumption. Workload control module 114 may, based on a cost model, identify opportunities to save cost by sending parts of application workload 104 to be processed by a distributed environment, e.g., distributed computing platform 112. Workload control module 114 may analyze the processed data and determine an appropriate platform to perform the work based on size of data, date and time, process singularities, and other factors. Workload control module 114 may determine a target environment to route application workload 104 based on the prioritized platforms, e.g., mainframe platform 110 and distributed computing platform 112. Workload control module 114 may perform a performance and cost assessment by applying performance and cost requirement of application workload 104 to determine the target environment. Workload control module 114 may select mainframe and distributed computing platforms respectively for each of the plurality of work units of application workload 104. The target environment may include mainframe platform 110 and distributed computing platform 112 with the plurality of work units of application workload 104 allocated to the target environment. When workload control module 114 determines two or more environments provide a same cost, workload control module 114 may select an option with a higher performance history for a type of workload associated with application workload 104. When workload control module 114 determines two or more environments provide same performance characteristics, workload control module 114 may select the option with a lower cost. Workload control module 114 may select a computing platform based on a lower cost, better performance, or any other performance or business indicator. Workload control module 114 may define performance or business indicators, for example, "cost-centric" solutions for some types of workload, and "performance-centric" solutions for other workloads. Workload control module 114 may query the processing environment for additional data, e.g., processing time, I/O count, and memory usage. Workload control module 114 may process and update data repository 106 to update decision-making information data.

In one or more embodiments, workload control module 114 is configured to allocate the plurality of work units of application workload 104 to run on mainframe platform 110 and distributed computing platform 112 respectively to balance performance and cost in real time. For example, workload control module 114 may decompose the plurality of work units and can send some work units based on a cost model to be processed on distributed computing platform 112 to avoid exceeding the mainframe costs based on the consumption. Workload control module 114 may allocate application workload 104 to a target environment which may include mainframe platform 110 and distributed computing platform 112. Workload control module 114 may allocate each work unit of application workload 104 to the target environment, e.g., respective mainframe platform 110 and distributed computing platform 112. Workload control module 114 may update historical data based on the target environment allocated to application workload 104. Workload control module 114 may allocate application workload 104 based on changes in input data (e.g., performance, cost) from a user. Workload control module 114 may allocate application workload 104 with dynamical mixed platforms procedures which can run each time in different combination of servers according to the moment application workload 104 is running (e.g., using the collected and processed data to decide). Workload control module 114 may analyze the history of evaluations on how to split application workload 104 between mainframe platform 110 and distributed computing platform 112 to continuously learn a solution to balance performance, reliability and costs.

Figure 2:
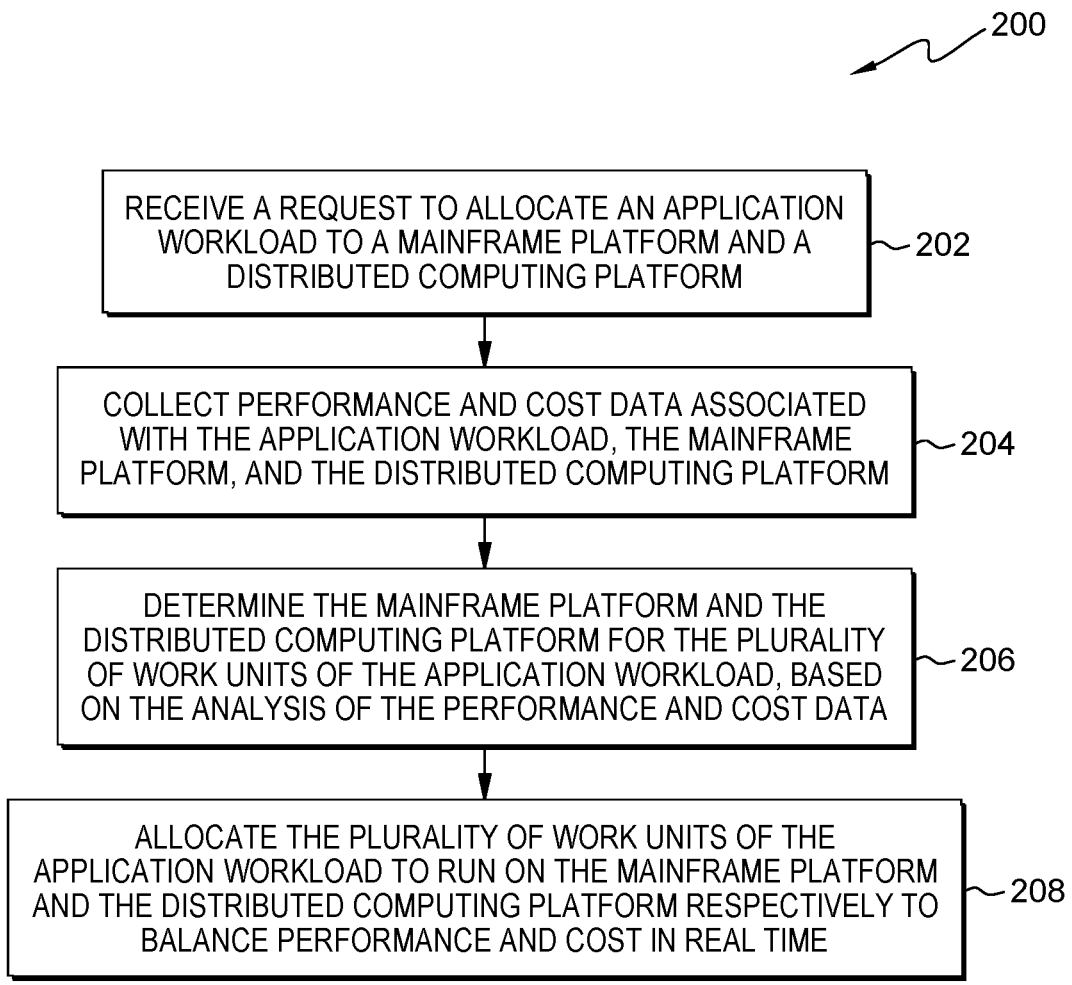
FIG. 2 is a flowchart depicting operational steps of a workload control module within a computing device of FIG. 1, in accordance with an embodiment of the present disclosure.

FIG. 2 is a flowchart 200 depicting operational steps of workload control module 114 in accordance with an embodiment of the present disclosure.

Workload control module 114 operates to receive a request to allocate application workload 104 to mainframe platform 110 and distributed computing platform 112. Workload control module 114 also operates to collect performance and cost data associated with mainframe platform 110, distributed computing platform 112, and application workload 104. Workload control module 114 operates to determine mainframe platform 110 and distributed computing platform 112 for the plurality of work units of application workload 104, based on the analysis of the performance and cost data and requirements associated with application workload 104. Workload control module 114 operates to allocate the plurality of work units of application workload 104 to run on mainframe platform 110 and distributed computing platform 112 respectively to balance performance and cost in real time.

In step 202, workload control module 114 receives a request to allocate application workload 104 to mainframe platform 110 and distributed computing platform 112. In an example, workload control module 114 may receive a request to allocate application workload 104 from a user. In another example, workload control module 114 may automatically receive application workload 104 to be allocated to mainframe platform 110 and distributed computing platform 112. Application workload 104 may include a plurality of work units to be allocated to run on mainframe platform 110 and distributed computing platform 112 respectively. Each work unit can be a logic piece of application workload 104 that can run on mainframe platform 110 and distributed computing platform 112. Workload control module 114 may check data repository 106 for information related to application workload 104 to be processed. For example, workload control module 114 may search data and information associated with application workload 104, including, for example, the system or network where application workload 104 is from, operating system, required components (e.g., network, I/O, memory, CPU), system affinity, and priority information (e.g., acquired either from application workload 104 itself or data repository 106). Workload control module 114 may determine whether any historical data related to application workload 104 exists in data repository 106. If workload control module 114 determines some historical data related to application workload 104 exists in data repository 106, workload control module 114 may further verify the historical data related to the application workload. If workload control module 114 determines no historical data related to application workload 104 exists in data repository 106, workload control module 114 may compare priority of application workload 104 with processing capacity of eligible platforms, for example, mainframe platform 110 and distributed computing platform 112. Workload control module 114 may perform a cost estimation of running application workload 104 in each eligible platform, for example, mainframe platform 110 and distributed computing platform 112.

In step 204, workload control module 114 collects performance and cost data associated with mainframe platform 110, distributed computing platform 112, and application workload 104. Workload control module 114 may analyze and process the collected performance and cost data. The performance and cost data can be from data repository 106. The collected data can be further saved and updated in data repository 106. The performance and cost data may include usage, cost, latency, and throughput data. The performance and cost data may process priority, processing index, data requirement, connectivity, system affinity, server health, management, and business data. For example, performance and cost data may be information including usage, the number of servers, response-time, cost, connectivity, and throughput of mainframe platform 110 and distributed computing platform 112. The performance and cost data may be collected from data system management and resource management data of mainframe platform 110. Workload control module 114 may collect and process data from a variety of data sources to enable the decision making on running available applications on mainframe or distributed systems, e.g., mainframe platform 110 and distributed computing platform 112, based on relevant information processed. Some samples of relevant information may include processing cost, latency, throughput, availability, and others. Workload control module 114 may collect user input data and preferences to compare against the performance and cost data from mainframe platform 110 and distributed computing platform 112. Workload control module 114 may collect and analyze data from a variety of sources to gather the performance and cost data associated with application workload 104. The performance and cost data may include process priority, processing index (e.g., how much CPU application workload 104 is expected to consume), data requirements (e.g., data base access, file access), connectivity, system affinity. The performance and cost data may include server health data, for example, connectivity, availability, processing speed and capacity, memory, I/O rate, cost, and networking. Workload control module 114 may collect and analyze management and business data, for example, key performance indexes, cost models, and application and system thresholds to determine where workload control module 114 run in a variety of heterogeneous environments that dispose the required components to process application workload 104.

In step 206, workload control module 114 determines mainframe platform 110 and distributed computing platform 112 for the plurality of work units of application workload 104, based on the analysis of the performance and cost data and requirements associated with application workload 104. Workload control module 114 may prioritize each eligible platform, for example, mainframe platform 110 and distributed computing platform 112 for the plurality of work units of application workload 104. Workload control module 114 may evaluate application workload 104. Workload control module 114 may break application workload 104 in logical pieces, e.g., work units. Workload control module 114 may rank activities of work units in application workload 104 based on the resource consumption. Workload control module 114 may, based on a cost model, identify opportunities to save cost by sending parts of application workload 104 to be processed by a distributed environment, e.g., distributed computing platform 112. Workload control module 114 may analyze the processed data and determine an appropriate platform to perform the work based on size of data, date and time, process singularities, and other factors. Workload control module 114 may determine a target environment to route application workload 104 based on the prioritized platforms, e.g., mainframe platform 110 and distributed computing platform 112. Workload control module 114 may perform a performance and cost assessment applying performance and cost requirement of application workload 104 to determine the target environment. Workload control module 114 may select mainframe and distributed computing platforms respectively for each of the plurality of work units of application workload 104. The target environment may include mainframe platform 110 and distributed computing platform 112 with the plurality of work units of application workload 104 allocated to the target environment. When workload control module 114 determines two or more environments provide a same cost, workload control module 114 may select an option with a higher performance history for a type of workload associated with application workload 104. When workload control module 114 determines two or more environments provide same performance characteristics, workload control module 114 may select the option with a lower cost. Workload control module 114 may select a computing platform based on a lower cost, better performance, or any other performance or business indicator. Workload control module 114 may define performance or business indicators, for example, "cost-centric" solutions for some types of workload, and "performance-centric" solutions for other workloads. Workload control module 114 may query the processing environment for additional data, e.g., processing time, I/O count, and memory usage. Workload control module 114 may process and update data repository 106 to update decision-making information data.

In step 208, workload control module 114 allocates the plurality of work units of application workload 104 to run on mainframe platform 110 and distributed computing platform 112 respectively to balance performance and cost in real time. For example, workload control module 114 may decompose the plurality of work units and can send some work units based on a cost model to be processed on distributed computing platform 112 to avoid exceeding the mainframe costs based on the consumption. Workload control module 114 may allocate application workload 104 to a target environment which may include mainframe platform 110 and distributed computing platform 112. Workload control module 114 may allocate each work unit of application workload 104 to the target environment, e.g., respective mainframe platform 110 and distributed computing platform 112. Workload control module 114 may update historical data based on the target environment allocated to application workload 104. Workload control module 114 may allocate application workload 104 based on changes in input data (e.g., performance, cost) from a user. Workload control module 114 may allocate application workload 104 with dynamical mixed platforms procedures which can run each time in different combination of servers according to the moment application workload 104 is running (e.g., using the collected and processed data to decide). Allocate application workload 104 may analyze the history of evaluations on how to split application workload 104 between mainframe platform 110 and distributed computing platform 112 to continuously learn a solution to balance performance, reliability and costs.

Figure 3:
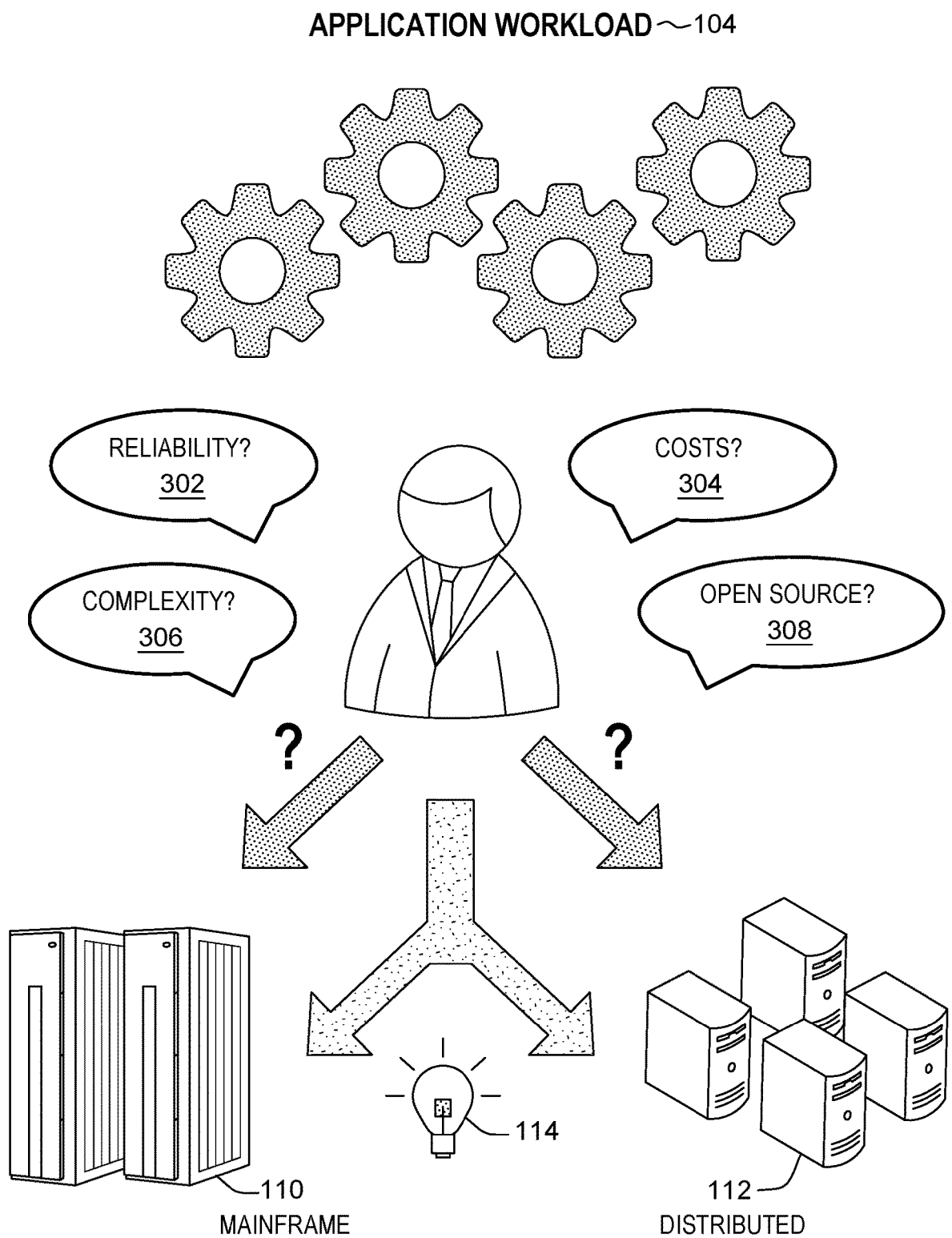
FIG. 3 is an example environment applying the workload control module of FIG. 1 in accordance with an embodiment of the present disclosure.

FIG. 3 is an example environment applying workload control module 114 in accordance with an embodiment of the present disclosure.

In the example of FIG. 3, a user or an organization needs to determine where to run application workload 104 between mainframe platform 110 and distributed computing platform 112. Factors need to consider include reliability 302, costs 304, complexity 306, open source 308, and other suitable consideration. For example, a user may need to decide if the entire application workload 104 will go to mainframe platform 110 or distributed computing platform 112. In another example, a user may need to decide if a part of application workload 104 can run on mainframe platform 110 and another part of application workload 104 can run on distributed computing platform 112. Workload control module 114 is configured to support the decision in real time if a part of application workload 104 can run on mainframe platform 110 and or another part of application workload 104 can run on distributed computing platform 112, based on the cost models used, performance metrics, availability and so on.

Figure 4:
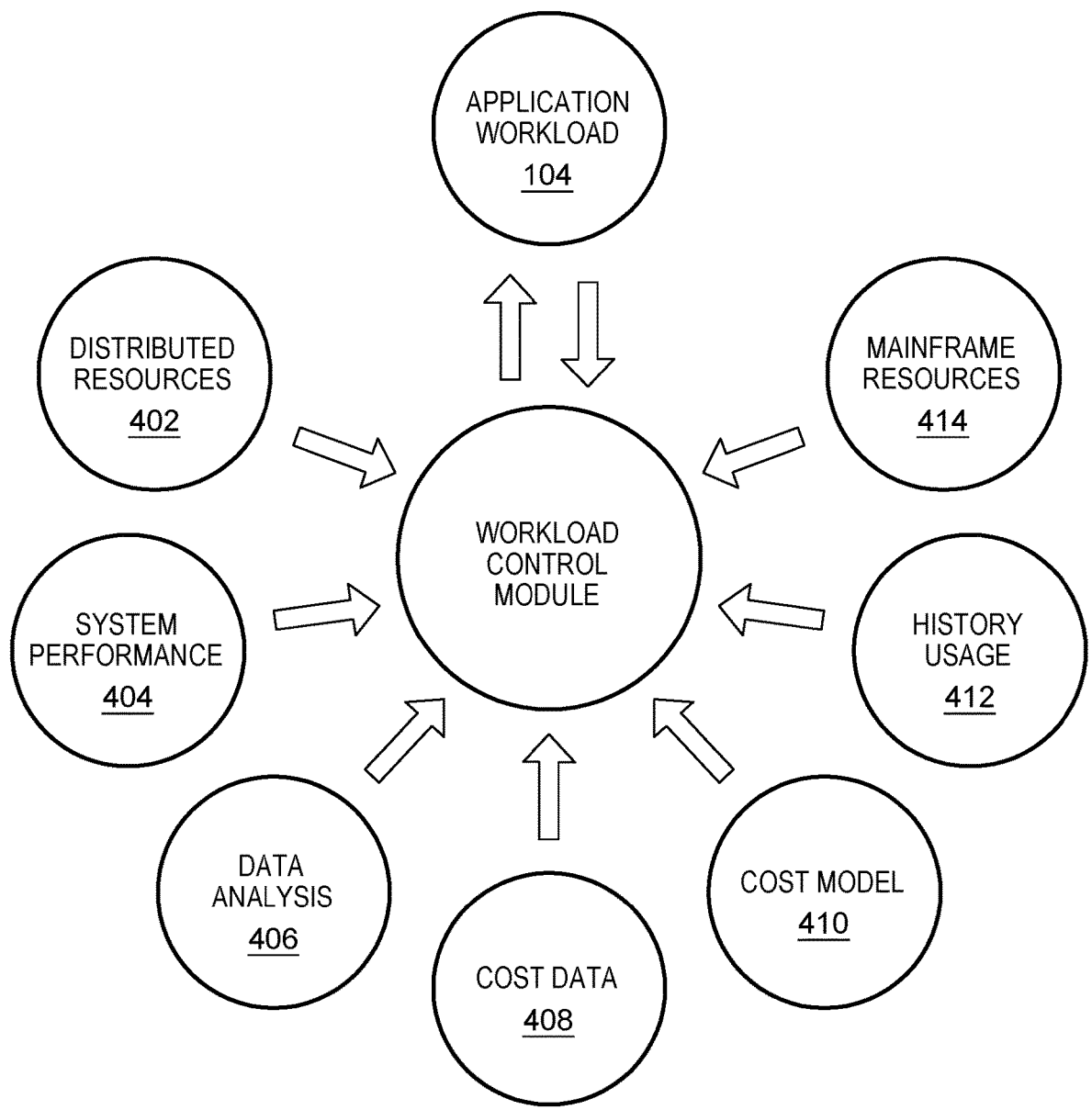
FIG. 4 is an exemplary functional diagram of the workload control module of FIG. 1 in accordance with an embodiment of the present disclosure.

FIG. 4 is an exemplary functional diagram of workload control module 114 in accordance with an embodiment of the present disclosure.

In the example of FIG. 4, workload control module 114 may collect and analyze various source data in determining and allocating application workload 104 to run between mainframe platform 110 and distributed computing platform 112. The source data can be from or about, for example, distributed resources 402, system performance 404, data analysis 406, cost data 408, cost model 410, history usage 412, and mainframe resources 414.

Figure 5:
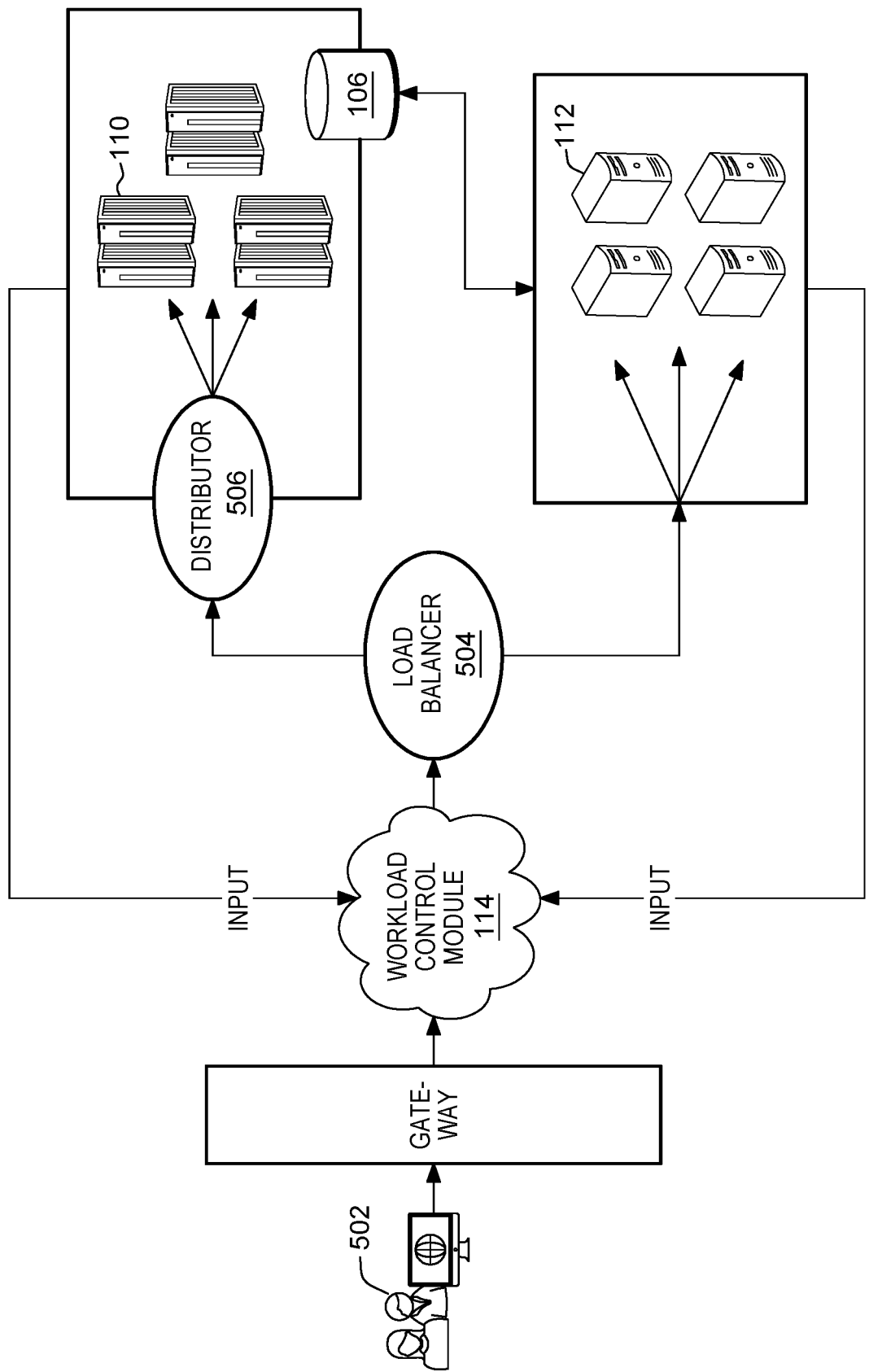
FIG. 5 is an exemplary architecture diagram depicting operational steps of the workload control module of FIG. 1 in accordance with an embodiment of the present disclosure.

FIG. 5 is an exemplary architecture diagram depicting operational steps of workload control module 114 in accordance with an embodiment of the present disclosure.

In the example of FIG. 5, user 502 may request application workload 104 to be allocated to mainframe platform 110 and distributed computing platform 112. Workload control module 114 can work as a front-line mechanism to provide decision-making information to which environment will receive application workload 104. Application workload 104 may further be controlled and balanced by load balancer 504. Load balancer 504 may distribute a set of tasks over a set of resources (e.g., computing units), with the aim of making the overall processing more efficient. Load balancer 504 may optimize the response time for each task, avoiding unevenly overloading compute nodes while other compute nodes are left idle. Workload control module 114 may send application workload 104 through distributor 506 to mainframe platform 110. Distributor 506 may extend the notion of dynamic virtual IP address (VIPA) and automatic VIPA takeover to allow for load distribution among target servers. Distributor 506 may optimally distribute incoming connection requests between a set of available servers. In order to determine a fit for application workload 104, workload control module 114 may receive information from each environment, e.g., a multi cloud management platform that holds data about the variety of clouds under its management, including number of servers, response-time, cost, connectivity and capacity.

When workload control module 114 receives a new workload, e.g., application workload 104, workload control module 114 may check data repository 106 for information related to the work to be processed. The information can include the system or network where application workload comes from, operating system, required components (network, I/O, memory, CPU), system affinity, and priority. After a determination of the resource and priority requirements of application workload 104, workload control module 114 may pull the performance/business/cost/criticality data from data repository 106 to determine a fit for the work to be processed. Workload control module 114 may request a new inquiry on the eligible environments to refresh performance and resources data in data repository 106. When workload control module 114 acquires the required data from the environments or data repository 106, workload control module 114 may apply a business logic to determine the environment where application workload 104 will be routed. Workload control module 114 may use information provided by user 502 to select a fit based on performance and cost assessment. In the event two or more environment provides the same cost, workload control module 114 can select the option with a better performance history for that type of workload. If two or more environments provide similar performance characteristics, workload control module 114 will select the option with a lower cost. For example, when two example requesters for a same service, one is from a critical branch and the other is from a non-critical branch. When workload control module 114 receives the request, workload control module 114 checks the source and verifies if the request is from a critical or non-critical user, the cost related to the process, the platform availability and the time for execution. If the requester is from a critical profile, workload control module 114 prioritizes the platform availability and time for execution comparing to the cost historical data, based on that workload control module 114 will determine the request to execute on mainframe platform 110 if the condition is favorable. If the requester is from a non-critical profile, workload control module 114 prioritizes the platform availability and cost comparing to the cost historical data, based on that workload control module 114 will determine the request to execute on distributed computing platform 112 if the condition is favorable. The decision on selecting a system with lower cost, better performance, or any other performance or business indicator can be defined by workload control module 114, being able to define "cost-centric" solution for some types of workload, and "performance-centric" solutions for other workloads.

Once the selection has been made, workload control module 114 may direct application workload 104 to load balancer 504. Workload control module 114 may save the selection for future reference and learning. When application workload 104 is processed and the result is returned to workload control module 114, workload control module 114 may record performance statistics (e.g., elapsed time, output size) and pass the packet back to user 502 (e.g., requester). Workload control module 114 may query the processing environment for additional data (e.g., processing time, I/O count, memory usage). Workload control module 114 may process the result of the query and update data repository 106 to update decision-making information data.

Figure 6:
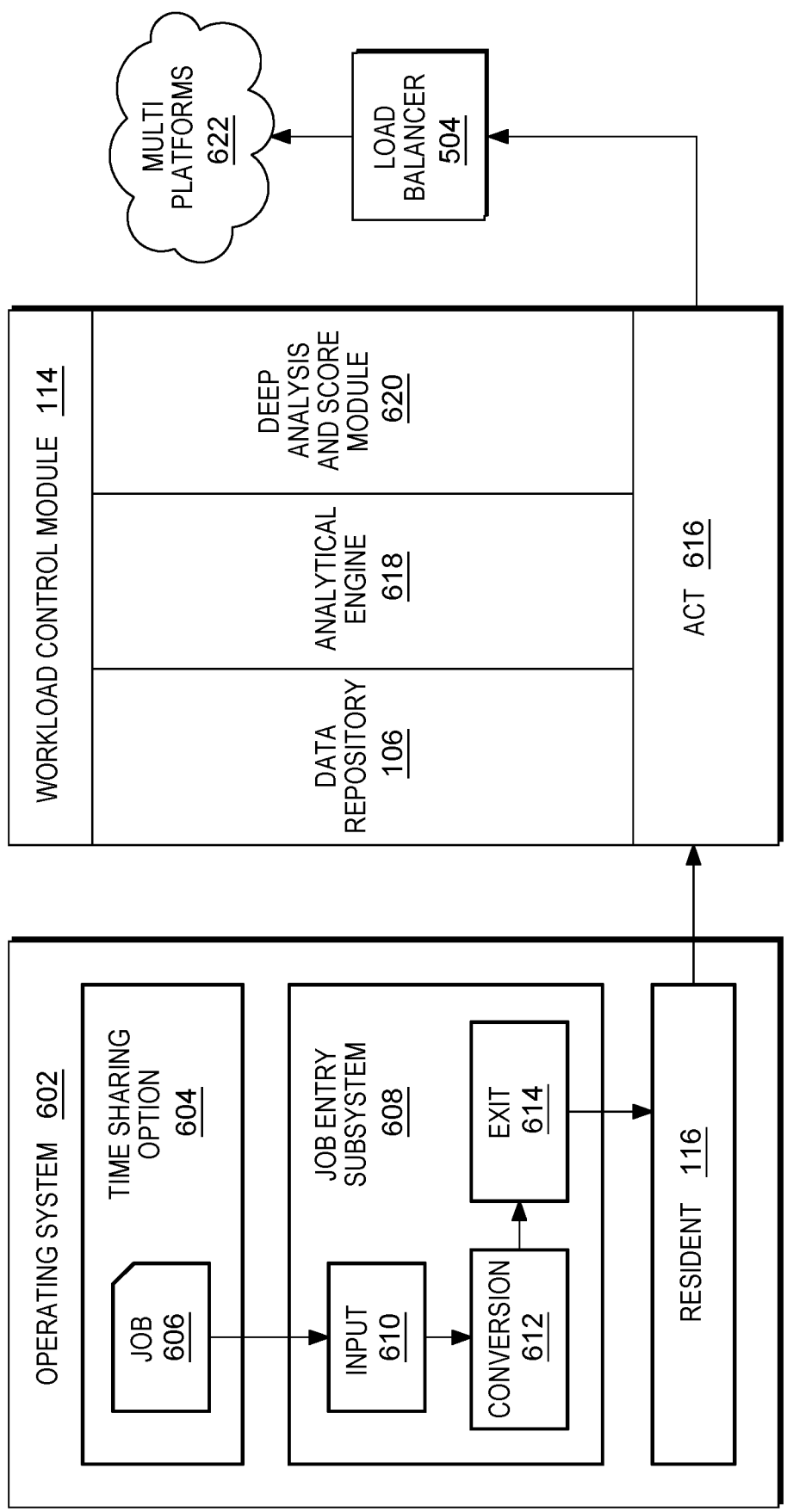
FIG. 6 is an exemplary functional diagram depicting operational steps of the workload control module of FIG. 1 in accordance with an embodiment of the present disclosure.

FIG. 6 is an exemplary functional diagram depicting operational steps of workload control module 114 in accordance with an embodiment of the present disclosure.

Figure 7:
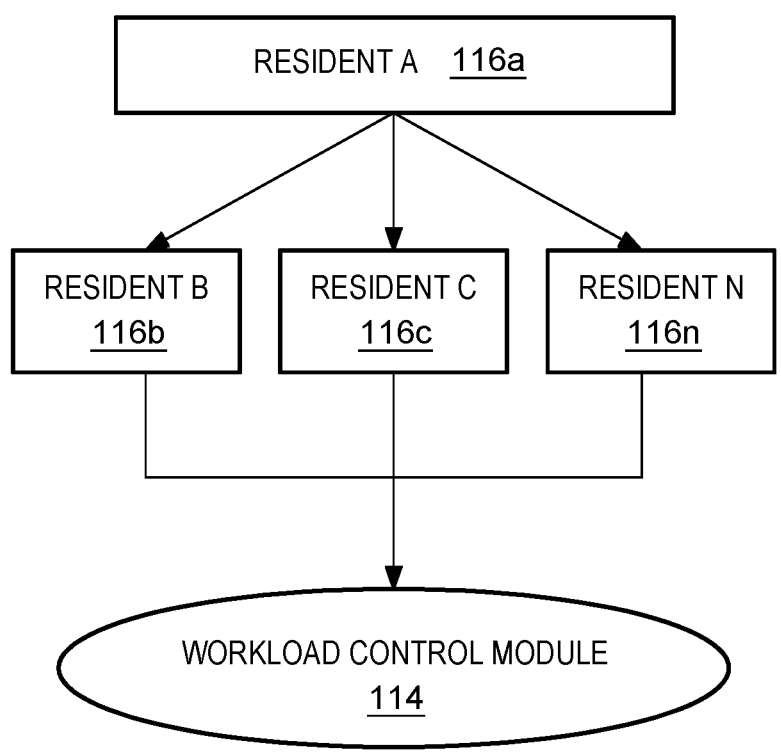
FIG. 7 is an exemplary functional diagram depicting operational steps of the workload control module and a resident of FIG. 1 in accordance with an embodiment of the present disclosure.

In the example of FIG. 6, workload control module may connect to one or multiple systems sharing resources, e.g., operating system 602, time sharing option 604 and job entry subsystem 608, and data repository 106. Workload control module 114 may pull the required performance and capacity indicators. Workload control module 114 may use resident 116 running on operating system 602 responsible for collecting system management facility and resource management facility data, processing and sending the required information to workload control module 114 upon request. Resident 116 may monitor and track mainframe resources to report back to workload control module 114 on performance and usage statistics, as well as workloads running in the environment. Resident 116 may orchestrate the workflow of each job 606 processing. Resident 116 may include a configuration file that holds each resident scope, configured by a system administrator or support analyst. When more than one resident is started on system, one of residents needs to be the focal resident which will receive job 606 and delegate for other residents to execute the steps fragmentation and the running orchestration. Optionally, resident 116 can also communicate with other residents in other logical partitions to consolidate data being sent over to workload control module 114. Details regarding a resident to communicate with other residents are illustrated in FIG. 7.

In order to keep transparency on batch processing and a same architecture provided to an online request, exit 614 may be placed on each mainframe system, e.g., mainframe platform 110. Exit 614 may intercept each job 606 triggered to run on job entry subsystem 608 and analyze if job 606 (e.g., a work unit of application workload 104) has potential to run in multi-platforms 622 (e.g., mainframe platform 110 and distributed computing platform 112), using a table hosted by resident 116 and managed by a system administrator. If a condition is satisfied, exit 614 may move the process to resident 116. Resident 116 may break job 606 by steps and send each one to workload control module 114 sequentially or not, depending on the relationship among the steps.

Workload control module 114 may include analytical engine 618 and deep analysis and score module 620. Analytical engine 618 and deep analysis and score module 620 may get the information from the required sources and may score the activities based on the resource consumption, cost information on contracts, and resources availability on both sides using common algorithms. Analytical engine 618 may also get input for historical evaluations ranked in term of success or not, to improve the actual evaluation.

In an example of batch processing running on multiple platforms 622, workload control module 114 may slice and process application workload 104 both types of platforms (e.g., mainframe platform 110 and distributed computing platform 112). For example, workload control module 114 may start the batch processing on mainframe platform 110, and may execute the critical processing which must be done by a specific target time and then run less critical steps, as checking and building reports, on distributed computing platform 112. Jobs 606 can start normally and can be placed on job entry subsystem 608. Once on job entry subsystem 608, after the phase of conversion 612, exit 614 may query on an eligibility list (managed by resident 116) if job 606 can be sliced for this type of processing. If resident 116 verifies the eligibility, workload control module 114 may act 616 (e.g., slice and orchestrate) the batch processing using resident 116. After the entire processing is finished, the response is sent to the user.

FIG. 7 is an exemplary functional diagram depicting operational steps of workload control module 114 and resident 116 in accordance with an embodiment of the present disclosure.

In the example of FIG. 7, resident 116, e.g., 116a may delegate other residents, e.g., residents 116b, 116c, 116n to execute step fragmentation and run orchestration. For example, resident 116a can communicate with other residents, e.g., residents 116b, 116c, 116n in other logical partitions to consolidate data being sent over to workload control module 114.

Figure 8:
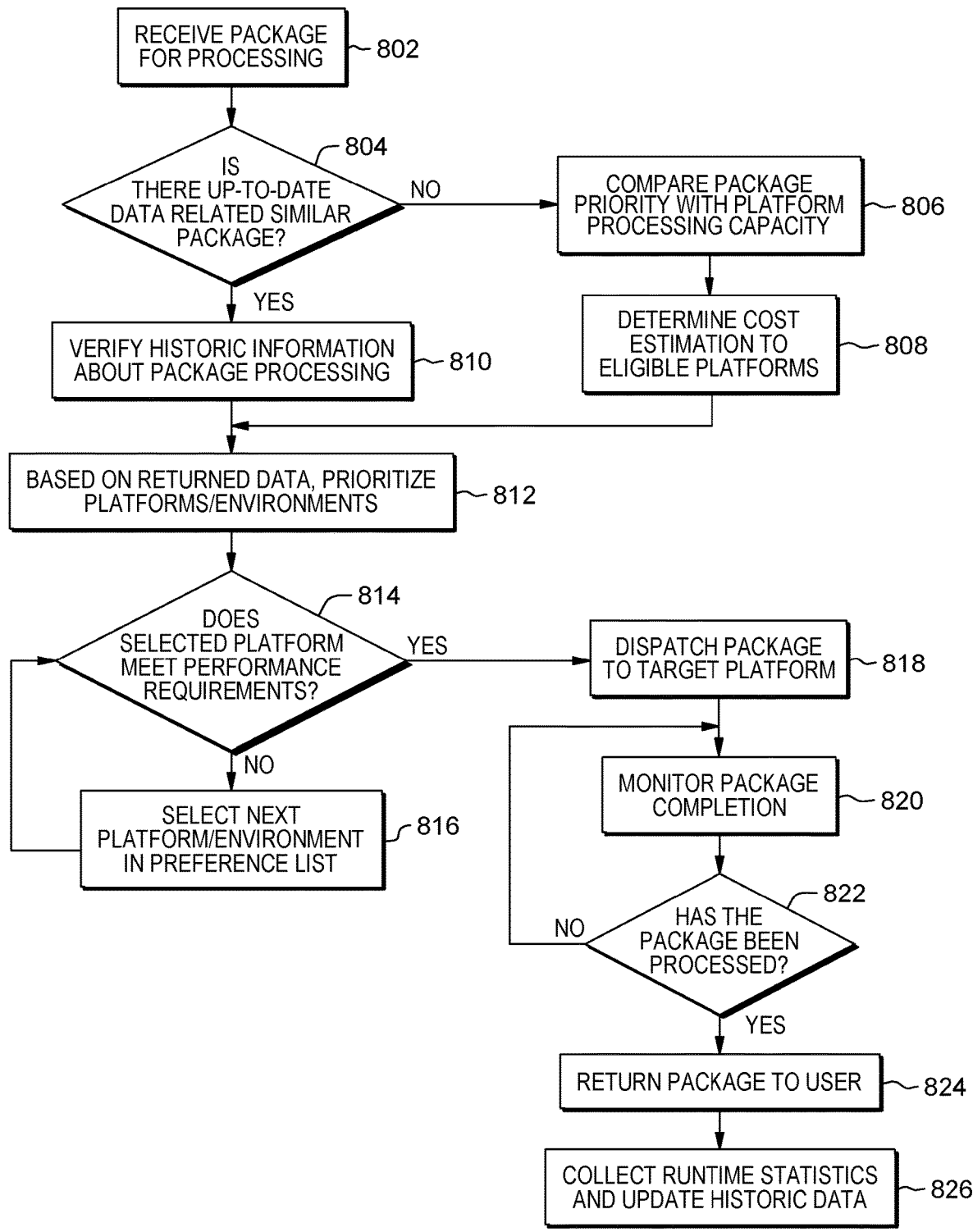
FIG. 8 is an exemplary functional diagram depicting operational steps of the workload control module of FIG. 1 in accordance with an embodiment of the present disclosure.

FIG. 8 is an exemplary functional diagram depicting operational steps of workload control module 114 in accordance with an embodiment of the present disclosure.

In block 802, workload control module 114 receives a request to process a package of application workload 104. The package can be a work unit of application workload 104 to allocate to mainframe platform 110 and distributed computing platform 112. Application workload 104 may include a plurality of work units to be allocated to run on mainframe platform 110 and distributed computing platform 112 respectively. Each work unit can be a logic piece of application workload 104 that can run on mainframe platform 110 and distributed computing platform 112.

In block 804, workload control module 114 determines whether any up-to-date data related to the package of application workload 104 exists in data repository 106. If workload control module 114 determines some historical data related to the package exists in data repository 106, in block 810 workload control module 114 further verifies the historical data related to the package. If workload control module 114 determines no historical data related to package exists in data repository 106, in block 806 workload control module 114 compares priority of package with processing capacity of eligible platforms, for example, mainframe platform 110 and distributed computing platform 112. In block 808 workload control module 114 performs a cost estimation of running application workload 104 in each eligible platform, for example, mainframe platform 110 and distributed computing platform 112. In block 812, workload control module 114 prioritizes each eligible platform, for example, mainframe platform 110 and distributed computing platform 112 for the plurality of work units of application workload 104 based on returned data. Workload control module 114 may rank activities of work units in application workload 104 based on the resource consumption.

In block 814, workload control module 114 determines whether a selected platform (e.g., mainframe platform 110 and distributed computing platform 112) meets performance and cost requirements of application workload 104. If workload control module 114 determines that the selected platform does not meet performance and cost requirements of application workload 104, in block 816 workload control module 114 selects next platform in a preference list. If workload control module 114 determines that the selected platform meets performance and cost requirements of application workload 104, in block 818 workload control module 114 allocates the package to a target platform, e.g., mainframe platform 110 and distributed computing platform 112. In block 820, workload control module 114 monitors package completion. In block 822, workload control module 114 determines whether the package has been processed. If workload control module 114 determines that the package has not been processed, workload control module 114 continues to monitor the package completion. If workload control module 114 determines that the package has been processed, in block 824 workload control module 114 may return the package to the user. In block 826, workload control module 114 collects runtime statistics and update historic data.

Figure 9:
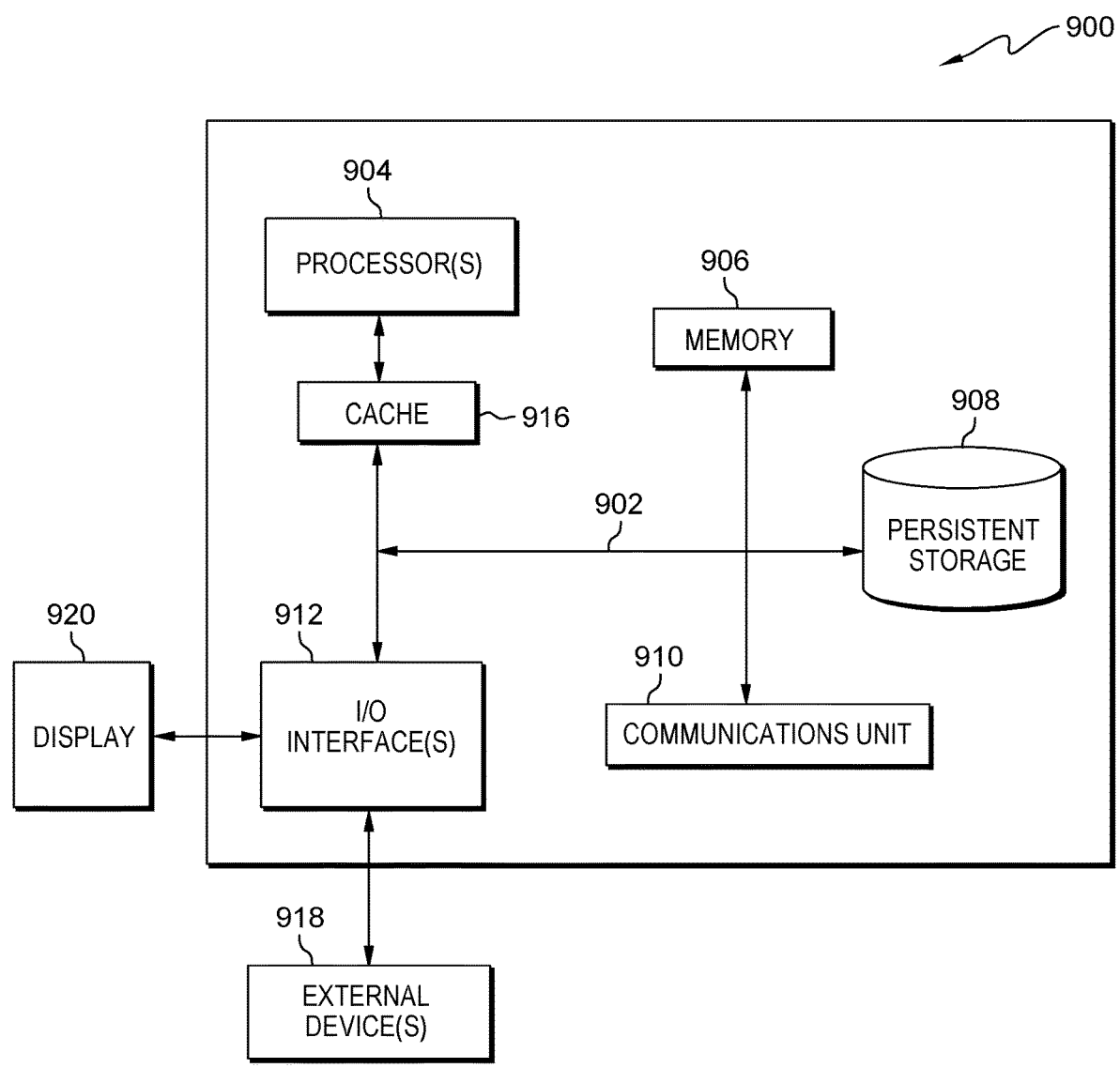
FIG. 9 is a block diagram of components of the computing device of FIG. 1, in accordance with an embodiment of the present disclosure.

FIG. 9 depicts a block diagram 900 of components of computing device 102 in accordance with an illustrative embodiment of the present disclosure. It should be appreciated that FIG. 9 provides only an illustration of one implementation and does not imply any limitations with regard to the environments in which different embodiments may be implemented. Many modifications to the depicted environment may be made.

Computing device 102 may include communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Workload control module 114 may be stored in persistent storage 908 and in memory 906 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Workload control module 114 may be downloaded to persistent storage 908 through communications unit 910.

I/O interface(s) 912 allows for input and output of data with other devices that may be connected to computing device 102. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., workload control module 114 can be stored on such portable computer readable storage media and can be loaded onto persistent storage 908 via I/O interface(s) 912. I/O interface(s) 912 also connect to display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
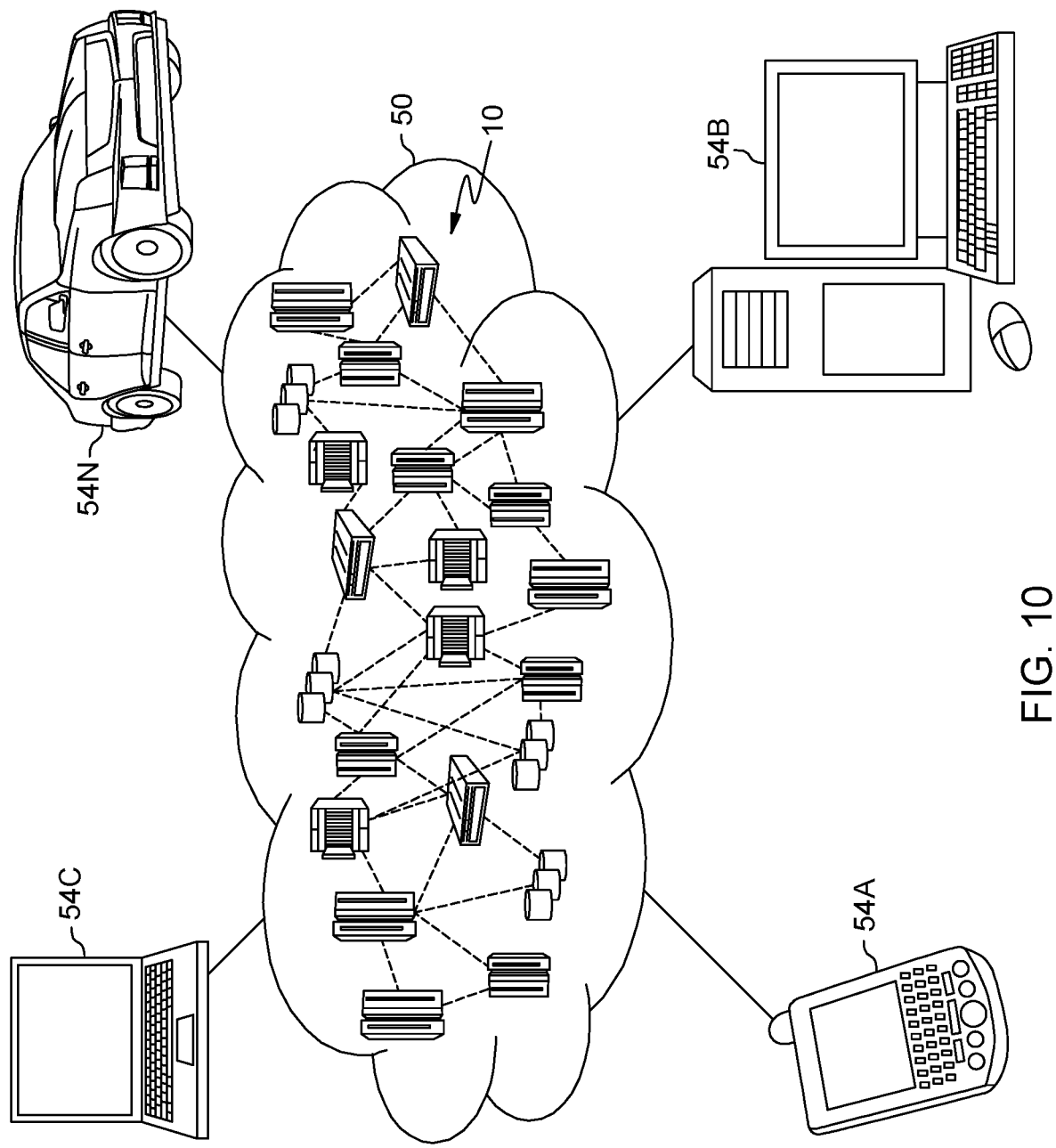
FIG. 10 depicts an embodiment of a cloud computing environment in accordance with the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
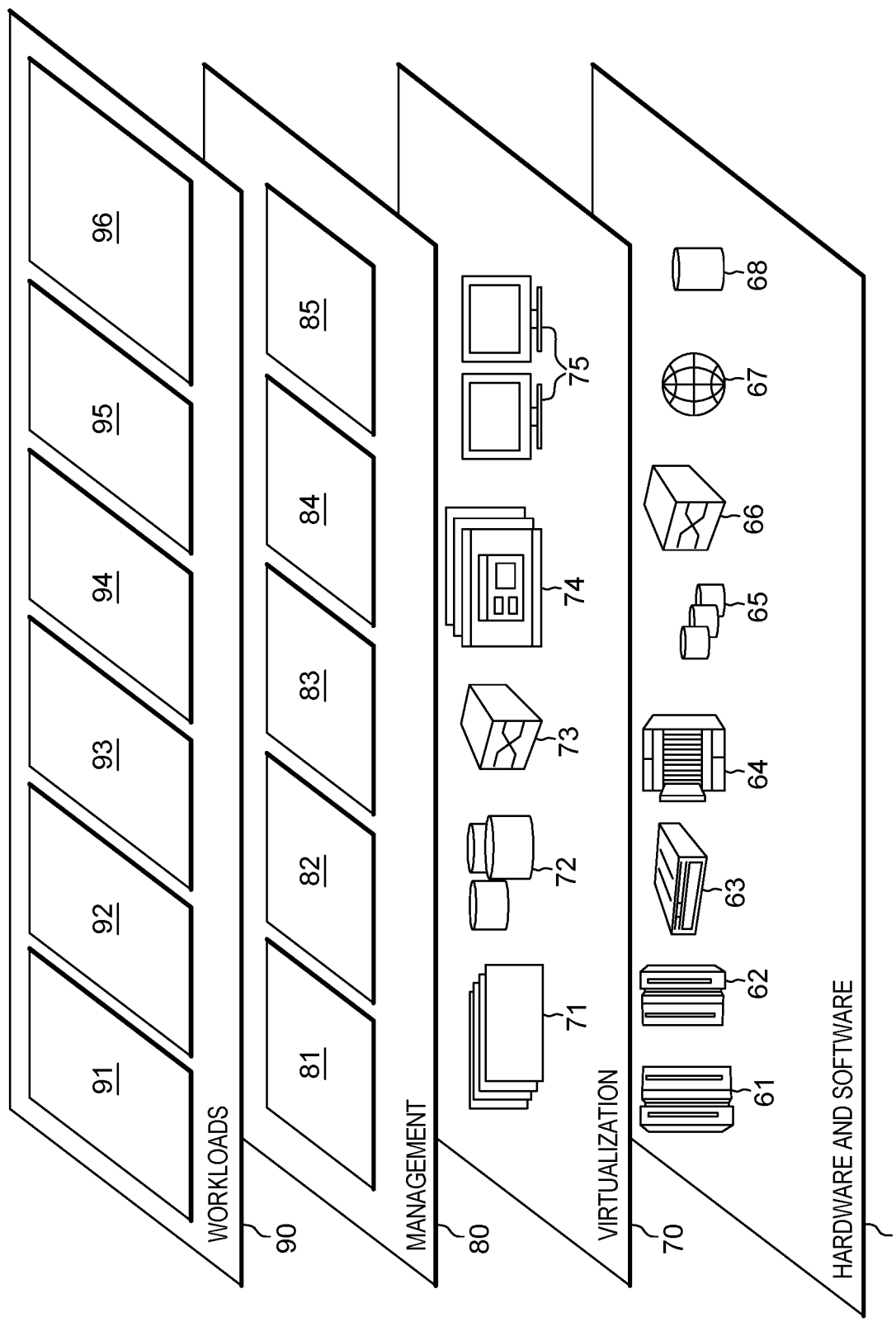
FIG. 11 depicts an embodiment of abstraction model layers of a cloud computing environment, in accordance with the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, workload control module 114 as described above with respect to workload control environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method executed by one or more processors comprising:
receiving a request to allocate an application workload to at least one target environment comprising at least one mainframe platform and at least one distributed computing platform, the application workload comprising a discrete application or service, the application workload including a plurality of work units;
evaluating the application workload and breaking the application workload into the plurality of work units;
ranking activities of the plurality of work units, the ranking comprising scoring the activities based on at least one of required resource consumption of the activities of the plurality of work units and cost information for use of the at least one target environment;
collecting data associated with and the at least one target environment, wherein the data includes performance and cost data associated with at least one of server availability, server processing speed, and server capacity for each server of a plurality of servers in the at least one target environment;
selecting a target environment from the at least one target environment, based on the ranking, an analysis of the performance and cost data, and a cost model, the selected target environment comprising at least one mainframe platform and at least one distributed computing platform, the cost model identifying opportunities to save costs based on sending at least one of the work units to the at least one distributed computing platform instead of the at least one mainframe platform;
allocating the plurality of work units of the application workload to execute on the selected target environment, based in part on the the cost model, wherein the allocating balances performance and cost of executing the plurality of work units of the application workload on the selected target environment while optimizing the time required for the selected target environment to respond to the received request;
initiating execution of the application workload on the selected target environment automatically after allocating the plurality of work units, wherein the selected target environment executes the application workload;
receiving results of the execution from the selected target environment; and
utilizing the received results for subsequent execution of one or more application workloads on the at least one target environment.

2. The computer-implemented method of claim 1, further comprising:
determining that historical data related to the application workload exists in a repository, wherein the historical data includes data of at least one historical processing performance of executing the application workload on the at least one target environment;
verifying the historical data; and
prioritizing the at least one target environment for the plurality of work units of the application workload based on the historical data.

3. The computer-implemented method of claim 1, further comprising:
determining that no historical data related to the application workload exists in a repository;
performing a cost estimation of allocating the plurality of work units of the application workload to the at least one target environment; and
prioritizing the at least one target environment for the plurality of work units of the application workload based on the cost estimation.

4. The computer-implemented method of claim 1, wherein the performance and cost data comprises data selected from the group consisting of: usage, cost, latency, and throughput data associated with the at least one target environment.

5. The computer-implemented method of claim 1, wherein selecting the at least one target environment for the plurality of work units of the application workload further comprises:
in response to determining two or more platforms within the selected target environment provide a same cost, selecting the platform with a higher performance history for a type of workload associated with the application workload; and
in response to determining two or more platforms within the selected target environment provide the same performance characteristics, selecting the platform with a lower cost.

6. The computer-implemented method of claim 1, further comprising dynamically updating historical data associated with the application workload to include the received execution results.

7. A computer program product comprising:
one or more computer readable storage media, and program instructions collectively stored on the one or more computer readable storage media, the program instructions comprising:
program instructions to receive a request to allocate an application workload to at least one target environment comprising at least one mainframe platform and at least one distributed computing platform, the application workload comprising a discrete application or service, the application workload including a plurality of work units;
program instructions to evaluate the application workload and break the application workload into the plurality of work units;
program instructions to rank activities of the plurality of work units, the ranking comprising scoring the activities based on at least one of required resource consumption of the activities of the plurality of work units and cost information for use of the at least one target environment;
program instructions to collect data associated with the at least one target environment, wherein the data includes performance and cost data associated with at least one of server availability, server processing speed, and server capacity for each server of a plurality of servers in the at least one target environment;
program instructions to select a target environment from the at least one target environment based on the ranking, an analysis of the performance and cost data, and a cost model, the selected target environment comprising at least one mainframe platform and at least one distributed computing platform, the cost model identifying opportunities to save costs based on sending at least one of the work units to the at least one distributed computing platform instead of the at least one mainframe platform;
program instructions to allocate the plurality of work units of the application workload to execute on the selected target environment based in part on the cost model, wherein the allocating balances performance and cost of executing the plurality of work units of the application workload on the selected target environment while optimizing the time required for the selected target environment to respond to the received request; and
program instructions to initiate execution of the application workload on the selected target environment automatically after allocating the plurality of work units, wherein the selected target environment executes the application workload;
program instructions to receive results of the execution from the selected target environment; and
program instructions to utilize the received results for subsequent execution of one or more application workloads on the at least one target environment.

8. The computer program product of claim 7, further comprising:
program instructions, stored on the one or more computer-readable storage media, to determine that historical data related to the application workload exists in a repository, wherein the historical data includes data of at least one historical processing performance of executing the application workload on the at least one target environment;
program instructions, stored on the one or more computer-readable storage media, to verify the historical data; and
program instructions, stored on the one or more computer-readable storage media, to prioritize the at least one target environment for the plurality of work units of the application workload based on the historical data.

9. The computer program product of claim 7, further comprising:
program instructions, stored on the one or more computer-readable storage media, to determine that no historical data related to the application workload exists in a repository;
program instructions, stored on the one or more computer-readable storage media, to perform a cost estimation of allocating the plurality of work units of the application workload to the at least one target environment; and
program instructions, stored on the one or more computer-readable storage media, to prioritize the at least one target environment for the plurality of work units of the application workload based on the cost estimation.

10. The computer program product of claim 7, wherein the performance and cost data comprises data selected from the group consisting of: usage, cost, latency, and throughput data associated with the at least one target environment.

11. The computer program product of claim 7, wherein program instructions to select the at least one target environment for the plurality of work units of the application workload further comprise:
program instructions, in response to determining two or more platforms within the selected target environment provide a same cost, to select the platform with a higher performance history for a type of workload associated with the application workload; and
program instructions, in response to determining two or more platforms within the selected target environment provide the same performance characteristics, to select the platform with a lower cost.

12. The computer program product of claim 7, further comprising program instructions, stored on the one or more computer-readable storage media, to dynamically update historical data associated with the application workload to include the received execution results.

13. A computer system comprising:
one or more computer processors, one or more computer readable storage media, and program instructions stored on the one or more computer readable storage media for execution by at least one of the one or more computer processors, the program instructions comprising:
program instructions to receive a request to allocate an application workload to at least one target environment comprising at least one mainframe platform and at least one distributed computing platform, the application workload comprising a discrete application or service, the application workload including a plurality of work units;
program instructions to evaluate the application workload and break the application workload into the plurality of work units;
program instructions to rank activities of the plurality of work units, the ranking comprising scoring the activities based on at least one of required resource consumption of the activities of the plurality of work units and cost information for use of the at least one target environment;
program instructions to collect data associated with the at least one target environment, wherein the data includes performance and cost data associated with at least one of server availability, server processing speed, and server capacity for each server of a plurality of servers in the at least one target environment;
program instructions to select a target environment from the at least one target environment based on the ranking, an analysis of the performance and cost data, and a cost model, the selected target environment comprising at least one mainframe platform and at least one distributed computing platform, the cost model identifying opportunities to save costs based on sending at least one of the work units to the at least one distributed computing platform instead of the at least one mainframe platform;
program instructions to allocate the plurality of work units of the application workload to MR execute on the selected target environment based in part on the cost model, wherein the allocating balances performance and cost of executing the plurality of work units of the application workload on the selected target environment while optimizing the time required for the selected target environment to respond to the received request; and
program instructions to initiate execution of the application workload on the selected target environment automatically after allocating the plurality of work units, wherein the selected target environment executes the application workload;
program instructions to receive results of the execution from the selected target environment; and
program instructions to utilize the received results for subsequent execution of one or more application workloads on the at least one target environment.

14. The computer system of claim 13, further comprising:
program instructions, stored on the one or more computer-readable storage media, to determine that historical data related to the application workload exists in a repository, wherein the historical data includes data of at least one historical processing performance of executing the application workload on the at least one target environment;
program instructions, stored on the one or more computer-readable storage media, to verify the historical data; and
program instructions, stored on the one or more computer-readable storage media, to prioritize the at least one target environment for the plurality of work units of the application workload based on the historical data.

15. The computer system of claim 13, further comprising:
program instructions, stored on the one or more computer-readable storage media, to determine that no historical data related to the application workload exists in a repository;
program instructions, stored on the one or more computer-readable storage media, to perform a cost estimation of allocating the plurality of work units of the application workload to the at least one target environment; and program instructions, stored on the one or more computer-readable storage media, to prioritize the at least one target environment for the plurality of work units of the application workload based on the cost estimation.

16. The computer system of claim 13, wherein the performance and cost data comprises data selected from the group consisting of: usage, cost, latency, and throughput data associated with the at least one target environment.

17. The computer system of claim 13, wherein program instructions to select the at least one target environment for the plurality of work units of the application workload further comprise:

program instructions, in response to determining two or more platforms within the selected target environment provide a same cost, to select the platform with a higher performance history for a type of workload associated with the application workload; and program instructions, in response to determining two or more platforms within the selected target environment provide the same performance characteristics, selecting the platform with a lower cost.

\* \* \* \* \*